C. H. PELTON.
GEARING.
APPLICATION FILED JUNE 23, 1915.
1,168,737.
Patented Jan. 18, 1916.
2 SHEETS—SHEET 1.
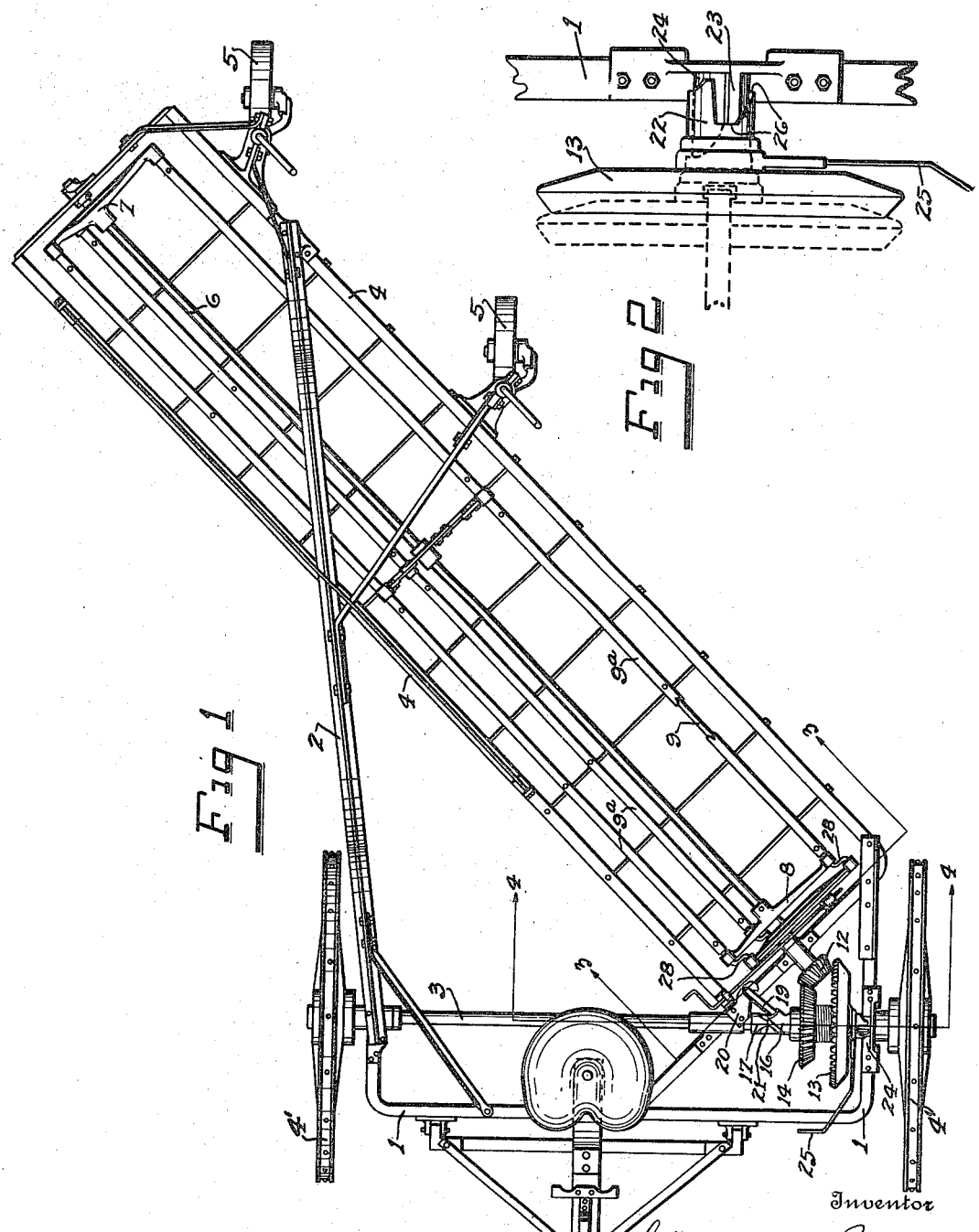

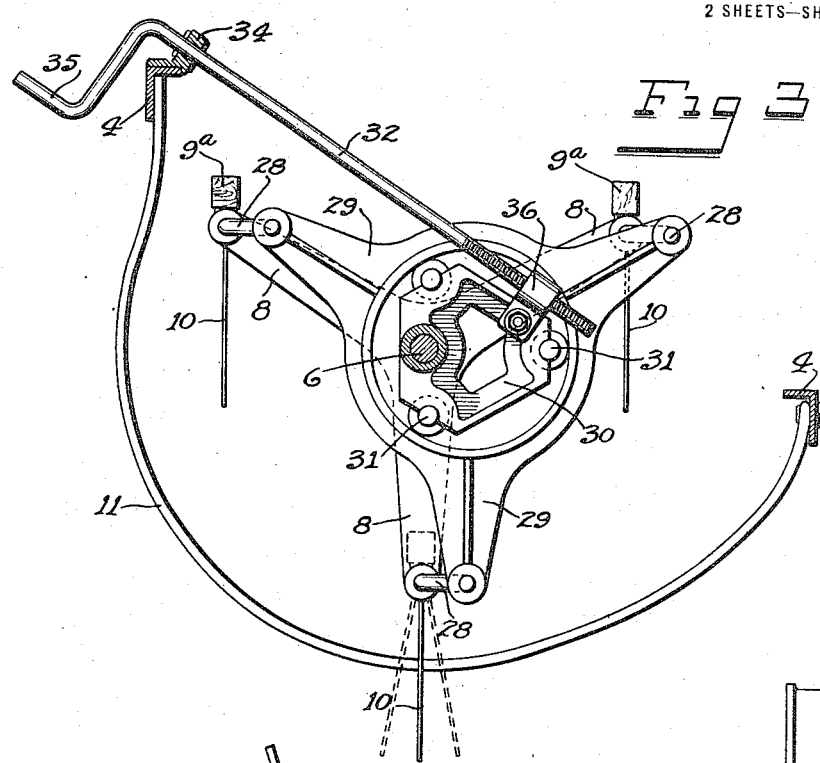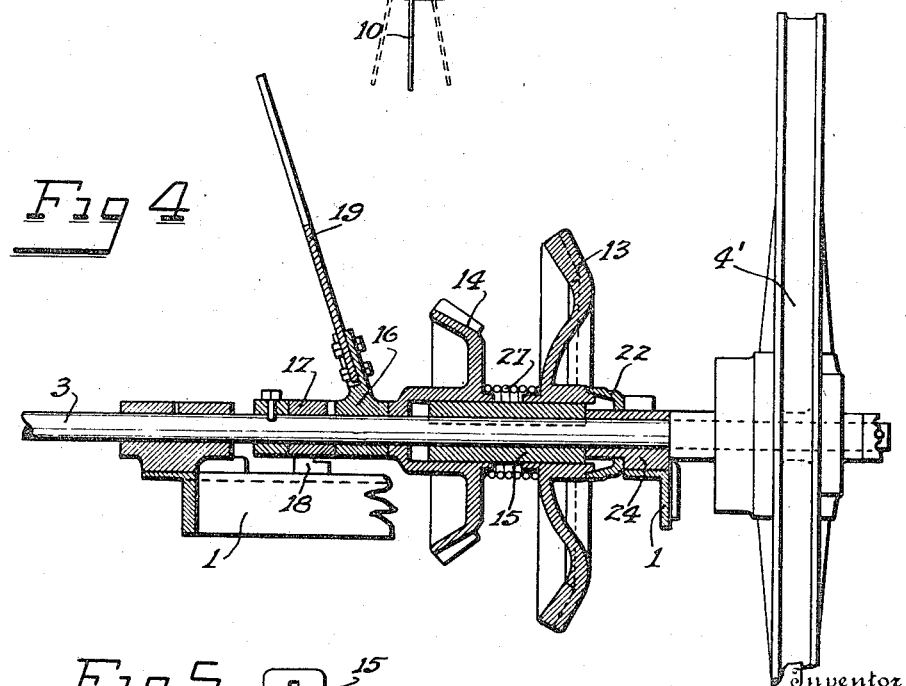

UNITED STATES PATENT OFFICE.

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

GEARING.

1,168,737.  Specification of Letters Patent.  Patented Jan. 18, 1916.

Application filed June 23, 1915. Serial No. 35,776.

*To all whom it may concern:*

Be it known that I, CHARLES H. PELTON, a citizen of the United States, residing at Springfield, in the county of Clark and State of Ohio, have invented certain new and useful Improvements in Gearing, of which the following is a specification.

My invention relates to hay rakes and tedders it more particularly relating to a machine of the side delivery type employing a rotary cylinder which carries the rake and tedding teeth in which provision is made for changing the direction of rotation of the cylinder and for changing the angularity of the teeth relatively to the ground line to adapt the machine for either raking or tedding.

One of the objects of the invention is to improve the means heretofore employed for changing the direction of rotation of the tooth cylinder.

Another object of the invention is to improve the means heretofore used for changing the angularity of the teeth.

A further object of the invention is to simplify and make more effective the operation of devices of this character.

In the accompanying drawings: Figure 1 is a top plan view of a machine embodying my improvements. Fig. 2 is a detail of a portion of the cylinder reversing devices. Fig. 3 is a section on the line 3—3 of Fig. 1. Fig. 4 is a section on the line 4—4 of Fig. 1. Fig. 5 is an end view of the axle sleeve.

The main frame of the machine consists of a U-shaped portion 1 having connected therewith a rearwardly extending arched side bar 2, the frame thus formed being provided with suitable bearings within which is journaled the main axle 3 rotatably connected to one of the carrying wheels 4'. Rigidly connected with the main frame 1 and bar 2 is the rake and tedding frame 4, which is further yieldably supported by the adjustable caster wheels 5 in the usual way; the frame 4 being rectangular in shape and extending at an angle from the main frame. Located in suitable bearings at the respective ends of the frame 4 is the rake shaft 6 to which is connected the tooth carrying cylinder. This cylinder consists of spider-shaped end frames 7 and 8 secured to the shaft and in which are journaled the shafts or rods 9 which carry the teeth 10; 11 representing the usual curved rods extending between the adjacent teeth to prevent the hay from winding about the teeth. The shafts 9 have clipped thereto the usual wooden bars 9ª which receive the ends of the rake teeth after they are coiled about the shafts. This arrangement of the main frame and raking frame and cylinder is one which has been in common use.

The improvements which I have devised for changing the direction of rotation of the cylinder and the angularity of the shaft will now be described. The cylinder shaft 6 is provided at its inner end with a beveled pinion 12 for engagement with either one of the two beveled gears 13 and 14, arranged to receive motion from the main axle 3 in the following manner: 15 represents a sleeve splined to the axle 3, the outer periphery of which is formed square in cross section. The gears 13 and 14 are slidably mounted upon this sleeve, the hubs of the gears being shaped to conform with the squared portion of the sleeve so as to be rotated therewith. The gear 14 is arranged to be shifted by a cam ring 16 loosely mounted upon the axle 3 against the hub of the gear and coöperating with the stationary cam ring 17 which also is loosely mounted on the shaft but is attached rigidly to the main frame 1 by an arm 18. The cam ring 16 has an operating lever 19 provided with a catch 20 to hold it in its operated position. Both of the rings 16 and 17 are provided with coöperating flat surfaces 21 at the highest point of the cam surface thereon so as to hold the ring 16 and the gear 14 in engaged position with the pinion 12. The gear 13 is arranged to be shifted by a cam ring 22 bearing against the hub thereof and coöperating with the stationary cam 23 which projects from the bearing 24 of the axle 3. A lever 25 is attached to the ring 22 for rotating the same and the ring 22 and cam 23 are likewise provided with coöperating flat surfaces 26 at the highest points thereof for holding the ring 22 and gear 13 in operative position. Both of the gears 13 and 14 are shifted against the tension of the spring 27, interposed between the respective gears, this spring 27 serving to throw the engaged gear out of mesh with the pinion when released by its cam. The arrangement of this spring is such that when one of the gears is shifted to engagement with the pinion, the spring is practically compressed to its fullest extent, thus preventing the shifting of the other gear until the engaged gear is released.

In order to maintain the rake teeth 10 at a constant angle to the ground line, each of the rake bars 9 has its inner end provided with a crank 28 which is pivotally connected to the arms of a spider 29 which is revolubly mounted upon a bearing 30, the bearing 30 being eccentrically mounted upon the shaft 6; such an arrangement being one which is well known in machines of this character. In the present construction, however, the bearing 30 is provided with a series of friction rollers 31 upon which the spider turns for the purpose of reducing friction between the parts. Also, in order that the angle of the teeth 10 may be changed to adapt them for either raking or tedding, I employ a shaft 32, one end of which is mounted in a bearing 34 on the frame 4 and has an operating crank arm 35, and the other end of which is threaded into a screwthreaded boss 36 on the bearing 30. By this arrangement the eccentric bearing 30 may be turned about its pivotal point on the shaft 6 and thereby cause the spider to rotate the rake bars to set the teeth at any desired angle. By reason of the screwthreaded engagement of the operating shaft 32 with the bearing 30 a very fine adjustment of the angularity of the teeth may be secured.

Having thus described my invention, I claim:—

1. In a machine of the character described, a rotary mechanism, a pinion connected therewith, a driving axle, two independent shiftable gears connected with said axle located, respectively, on opposite sides of said pinion, a coil spring between said gears, and means for throwing said gears alternately into engagement with said pinion against the tension of said spring.

2. In a machine of the character described, a rotary mechanism, a pinion connected therewith, a driving axle, two independent shiftable gears connected with said axle located respectively on opposite sides of said pinion, a coil spring between said gears, and cams associated with each gear for throwing the same into engagement with said pinion against the tension of said spring.

3. In a machine of the character described, a rotary mechanism, a pinion connected therewith, a driving axle, a sleeve rotatably connected therewith, independent slidable gears rotatably connected with said sleeve arranged respectively on opposite sides of said pinion, a coil spring between said gears, and cams associated with each of said gears for throwing the same into engagement with said pinion against the tension of said spring.

4. In a machine of the character described, a rotatable shaft, a beveled pinion connected with said shaft, a driving axle, two independent shiftable beveled gears connected with said axle and arranged respectively on opposite sides of said pinion, a coil spring between said gears, and means for throwing said gears alternately into engagement with said pinion.

In testimoney whereof, I have hereunto set my hand this 17th day of June 1915.

CHARLES H. PELTON.

Witness:
   CHAS. I. WELCH.